United States Patent [19]

Iwai et al.

[11] 4,332,310
[45] Jun. 1, 1982

[54] DEVICE FOR PREVENTING INTRUSION OF WATER, DUST, ETC. INTO DRUM BRAKE

[75] Inventors: Kazuhiro Iwai, Iruma; Hiroshi Enomoto, Higashikurume, both of Japan

[73] Assignee: Honda Giken Kogyo Kabushiki Kaisha, Tokyo, Japan

[21] Appl. No.: 144,348

[22] Filed: Apr. 28, 1980

[30] Foreign Application Priority Data

Jan. 5, 1979 [JP] Japan .................................. 54-58328

[51] Int. Cl.$^3$ ........................ F16J 15/54; F16D 65/10
[52] U.S. Cl. .................................... 188/218 A; 277/57
[58] Field of Search ............... 277/53, 57; 188/218 A, 188/218 R

[56] References Cited

U.S. PATENT DOCUMENTS 1,869,876 8/1932 Apple ............................. 188/218 A
1,888,475 11/1932 Schmitz ................................. 277/57
2,080,895 5/1937 Nelson .............................. 188/218 R

FOREIGN PATENT DOCUMENTS 1341045 9/1963 France ................................. 277/57

Primary Examiner—William Price
Attorney, Agent, or Firm—Polster, Polster and Lucchesi

[57] ABSTRACT

A device for preventing intrusion of water, dust, etc. into drum brake of an automotive vehicle, wherein a labyrinth is formed at a fitting portion between the outer peripheral surface of a brake panel fixed to the vehicle body and the outer peripheral surface of a brake drum rotatable together with wheels, and wherein the labyrinthine grooves are made larger as they go toward inside, and the edges of the partition walls and the brake panel of the brake drum forming the labyrinth are bent outward for effective prevention of the dust, etc. from entering into the brake drum.

1 Claim, 1 Drawing Figure

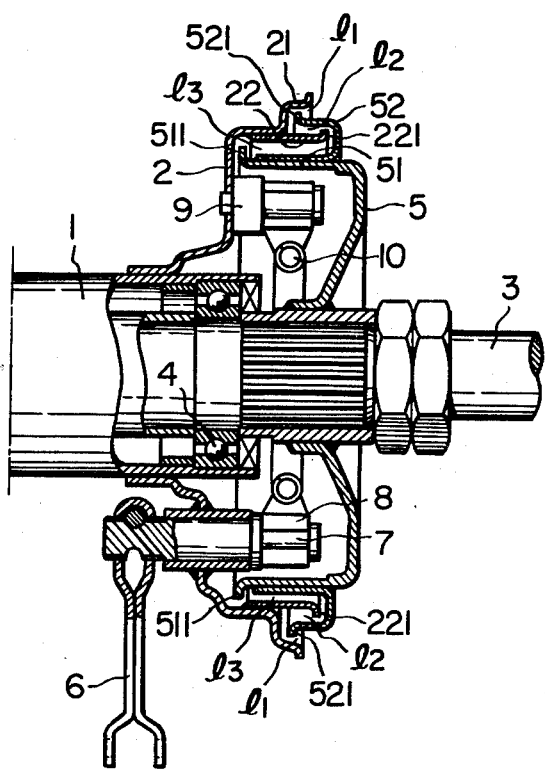

(## DEVICE FOR PREVENTING INTRUSION OF WATER, DUST, ETC. INTO DRUM BRAKE

BACKGROUND OF THE INVENTION

This invention relates to a device for preventing intrusion of water, dust, and other foreign substances into the drum brake of an automobile, motorcycle, and so forth.

Ordinarily, the drum brake prevents water, dust and other foreign substances from intruding into the brake mechanism of the automobiles by forming a labyrinth at the fitting portion between the outer peripheral surfaces of its brake panel and the outer peripheral surface of its brake drum. In view, however, of the fact that the labyrinth groove is shallow and small, those foreign substances which have once intruded into it readily pass through the fitting part to reach the brake mechanism, thereby dangerously reducing the braking effect.

SUMMARY OF THE INVENTION

The present invention has been made to solve the abovementioned problem, and aims at stopping, to the maximum possible extent, intrusion of water, dust, and other foreign substances into the brake mechanism.

According to the present invention, generally speaking, there is provided a device for preventing intrusion of water, dust, etc. into drum brake of an automotive vehicle, wherein a labyrinth is formed at a fitting portion between the outer peripheral surface of a brake panel fixed to the vehicle body and the outer peripheral surface of a brake drum rotatable together with wheels, characterized in that the labyrinthine grooves are made larger as they go toward inside, and the edges of the partition walls and the brake panel or the brake drum forming the labyrinth are bent outward for effective prevention of the dust, etc. from entering into the brake drum.

There has thus been outlined, rather broadly, the more important feature of the present invention in order that the detailed description thereof that follow may be better understood, and in order that the present contribution to the art may be better appreciated. There are, of course, additional feature of the invention that will be described hereinafter and which will form the subject of the claims appended hereto. Those skilled in the art will appreciate that the conception, upon which this disclosure is based may readily be utilized as a basis for the designing of other structures for the carrying out of the several purposes of the present invention. It is therefore important that the claims be regarded as including such equivalent construction so far as they do not depart from the spirit and scope of the present invention.

BRIEF DESCRIPTION OF THE ACCOMPANYING DRAWING

Specific embodiment of the present invention has been chosen for the purpose of illustration and description, and are shown in the accompanying drawing, forming a part of the specification, in which:

The single FIGURE is a side elevational view, in longitudinal cross-section, of a drum brake provided with the preventive device according to the present invention.

DETAILED DESCRIPTION OF PREFERRED EMBODIMENT

In the following, the construction of the dust preventive device according to the present invention will be described in detail in reference to the accompanying drawing.

In the drawing, a reference numeral 1 designates an axle tube connected with a vehicle body, a numeral 2 refers to a brake panel fixedly secured on the axle tube 1, a numeral 3 refers to a wheel axle supported on the axle tube 1 through a bearing 4, a reference numeral 5 designates a brake drum fixedly secured on the wheel axle 3, a numeral 6 refers to a brake operating arm, a numeral 7 refers to a brake cam, a numeral 8 refers to a brake shoe, a numeral 9 refers to an anchor pin, and a numeral 10 refers to a return spring.

In order to form a labyrinth between the outer peripheral surface 21 of the abovementioned brake panel 2 and the outer peripheral surface 51 of the brake drum 5, the fitting part therebetween is provided with partition walls 22, 52 on the brake panel 2 and the brake drum 5 in parallel with their respective outer peripheral surfaces.

The labyrinthine grooves $1_1$, $1_2$ and $1_3$ formed by the outer peripheral surface 21 of the brake panel, the outer peripheral surface 51 of the brake drum 5, and the partition walls 22, 52 become larger in size as they go inward. According to the embodiment, the length of the grooves is made sequentially longer toward inside, but, instead, the width or both length and width may be increased.

The edges 521, 221 and 511 of the partition walls 52, 22 and the outer peripheral surface 51 of the brake drum are bent outward. Therefore, water, dust and other foreign substances which tend to intrude into the groove $1_1$ are hindered by the edge 521 from entering inside. The foreign substances which have entered into the next groove $1_2$ over the edge 521 are hindered by the subsequent edge 221. Furthermore, even when the foreign substances enter into the subsequent groove $1_3$ over the edge 221, they are prevented from entering inside the brake mechanism due to the edge 511 at the edge of the groove end.

Moreover, since the labyrinthine grooves $1_1$, $1_2$ and $1_3$ become larger in size as they are toward inside (in a radial direction), inertia of the intruded substances becomes gradually weakened to make it difficult for the dust, etc. to enter into the brake drum. Therefore, in conjunction with the intrusion preventive action due to outward bending of the edge of each of the partition walls and the brake panel or the brake drum forming the labyrinth, intrusion of dust, water, etc. into the brake mechanism can be effectively reduced to the lowest possible extent.

What is claimed is:

1. In a drum brake of an automotive vehicle, a preventive device against instrusion of water, dust, etc. which comprises in combination:
    (a) an axle tube connected to a vehicle body;
    (b) a wheel axle supported in said axle tube;
    (c) a brake panel fixedly secured on said axle tube;
    (d) a brake drum fixedly secured on said wheel axle; and
    (e) axially extending, annular partition walls provided in a space at a fitting portion between the outer peripheral surface of said brake panel and the outer peripheral surface of said brake drum in parallel with the respective outer peripheral surfaces thereof to form a plurality of labyrinthine grooves, radially inwardly successive of said labyrinthine grooves being sequentially broader in breadth, or longer in length, or both, and all the edges of said partition walls, of said brake panel, and of said brake drum forming the labyrinth being bent radially outwardly for effective prevention of dust, etc. from entering into the brake drum.

* * * * *